United States Patent [19]

Tyros

[11] 4,357,790
[45] Nov. 9, 1982

[54] METHOD AND APPARATUS FOR PICKING OLIVES OR OTHER FRUITS

[76] Inventor: James C. Tyros, R.F.D. 1 River Rd., New Ipswich, N.H. 03071

[21] Appl. No.: 169,649

[22] Filed: Jul. 17, 1980

[30] Foreign Application Priority Data

Jul. 31, 1979 [GR] Greece .................................. 59742

[51] Int. Cl.³ ............................................. A01D 46/00
[52] U.S. Cl. ................................................. 56/328 R
[58] Field of Search ..................... 56/328 R, 329, 330, 56/331, 332

[56] References Cited

U.S. PATENT DOCUMENTS

| | | | |
|---|---|---|---|
| 3,968,631 | 7/1976 | Haines | 56/328 R |
| 3,987,608 | 10/1976 | Wilcox | 56/328 R |
| 4,000,601 | 1/1977 | St. Petery | 56/328 R |
| 4,069,652 | 1/1978 | Carlson | 56/328 R |

FOREIGN PATENT DOCUMENTS 581246  8/1958  Italy .................................. 56/328 R

*Primary Examiner*—Robert A. Hafer
*Attorney, Agent, or Firm*—Pearson & Pearson

[57] ABSTRACT

A power actuated picking head is mounted on the upper end of an elongated handle which is hand manipulated from ground level to pick tree borne olives or similar fruits. The picking head has a built-in collection hopper with an open top having ledges around its rim, and, a bottom discharge opening connected to a ground level receptacle by a cloth conduit for gravity guidance of the picked fruit without damage. A power rotated rake-like member, with right angularly hooked tines, rakes the fruit into the hopper, in cooperation with the ledges, while passing leaves and barring branches. A compartment in the head contains a motor, powered by flexible conduit from ground level.

10 Claims, 5 Drawing Figures

METHOD AND APPARATUS FOR PICKING OLIVES OR OTHER FRUITS

BACKGROUND OF THE INVENTION

The harvesting, or picking, of tree-borne olives or other fruits, nuts or the like has long been accomplished by hand, or by vibratory machines which shake the tree or by rods manipulated by hand or powered by machines.

Mechanical olive harvesting is the subject of experimentation in California, wherein an enormous machine on wheels includes one or more cushioned clamps which grip the tree trunk or branch and vibrate it to cause the fruit to fall into an equally enormous catching frame which must be maneuvered into position under the tree. The trees must be pruned to facilitate mechanical shaking so that the branches do not block the operator's view in attaching the shaker clamps.

Portable, hand manipulated shakers, or thinners, have also been proposed as in the ground level supported engines, elongated, reach rod, tree branch shaker head devices illustrated in U.S. Pat. No. 3,174,269 to Londo of Mar. 23, 1965 and U.S. Pat. No. 3,175,329 to Beckman of Mar. 30, 1965.

Portable, hand manipulated pickers have also been proposed, usually having one or more comb-like picking fingers in a picking head powered from ground level to reciprocate, or rotate, the fingers to dislodge the fruit from the tree as in the pistol grip type devices of U.S. Pat. No. 3,522,697 to Shaff of Aug. 4, 1970 or U.S. Pat. No. 3,701,242 to Townsend of Oct. 31, 1972.

Rotating comb like tines, or fingers, on a picking head carried at the upper end of a pole, or reach rod, and powered by a ground level engine are disclosed in U.S. Pat. No. 3,534,536 to Soler-Espiauba of Oct. 20, 1970.

SUMMARY OF THE INVENTION

In this invention, a portable, light weight, picking head is pivotally supported in a gimbal yoke at the upper end of an elongated handle, or rod, the head having a built-in collection hopper with an open top. The hopper has a rake-like member, with hooked tines, rotatable on a drive shaft journalled in the central upper portion of the hopper, so that the hooked tines reach out of the hopper to rake fruit into the hopper. The bottom wall of the hopper has a discharge opening connected by a light-weight, flexible, cloth, conduit to a ground supported receptacle, thereby guiding the fruit, by gravity, softly downward without damage, scattering or adding unmanageable weight to the head.

Preferably, a drive motor and power train is located in a separate covered compartment in the head to power the shaft and the motor is powered by a flexible power line from a ground supported power source. The motor is located in the lower portion of the head so as to act as a counterweight to retain the head in its gimbal yoke, with the open top of the hopper always facing the olives, or other fruit, depending from the tree branches as the head is worked through the foliage by ground level hand manipulation of the user.

The cover over the motor and power train compartment, and ledges extending around the peripheral, rim of the open top of the collection hopper engage and prevent branches from entering the hopper or becoming hooked in the right angularly hooked tines during passage of the picking head through the tree foliage.

DESCRIPTION OF THE PREFERRED EMBODIMENT

Figure 1:
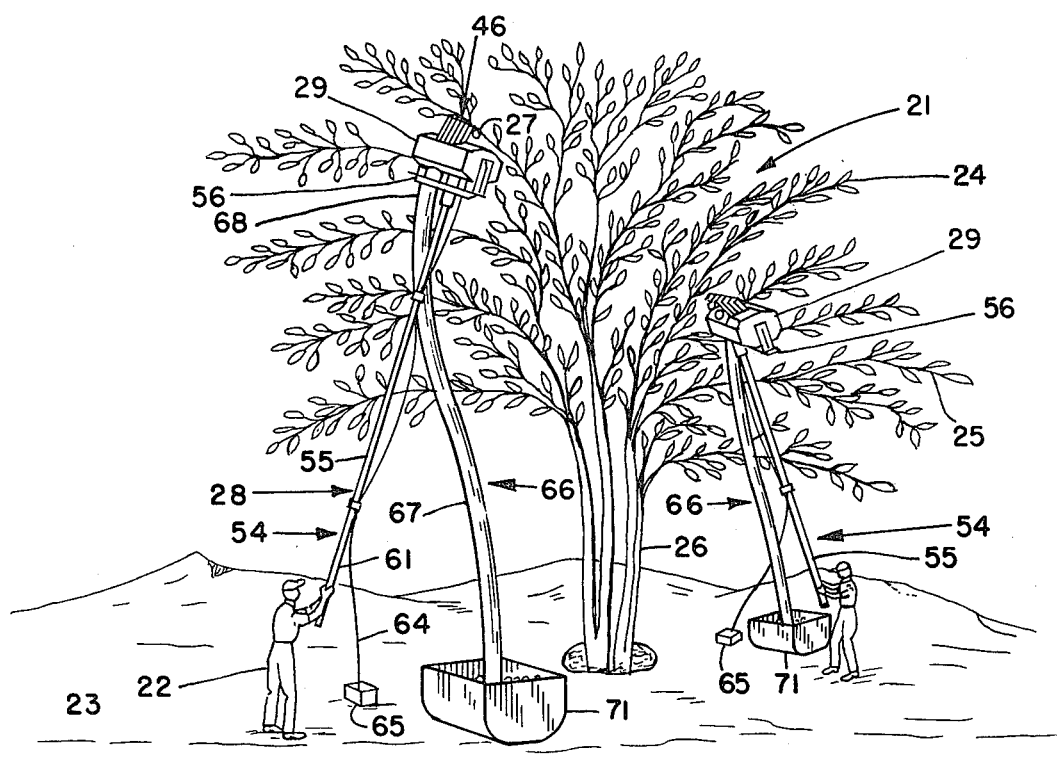
FIG. 1 is a diagrammatic, perspective view, illustrating the tree picking apparatus and method of the invention in use on an olive tree.

In FIG. 1, a typical ollive tree 21, in an olive grove is depicted, the tree extending well above the height of the average human 22 from ground level 23 and having foliage 24, branches 25, trunks 26 and olives 27.

The picking apparatus 28, of the invention includes the picking head 29, made of light-weight material such as aluminum, the head having a collection hopper 31 with an open top 32 alongside a power drive compartment 33 having a top cover 34.

The collection hopper 31 includes the front wall 35 and rear wall 36, the opposite end walls 37 and 38 and the bottom wall 39, the bottom wall 39 having a discharge opening 41. Preferably ledge means 42, in the form of ledges 43, 44 and 45 are provided to form the upper peripheral rim of the open top 32, the ledges cooperating with the cover 34 to engage twigs and branches of the tree while the olives 27 hanging downwardly therefrom are positioned to be gathered into the hopper 31.

Figure 5:
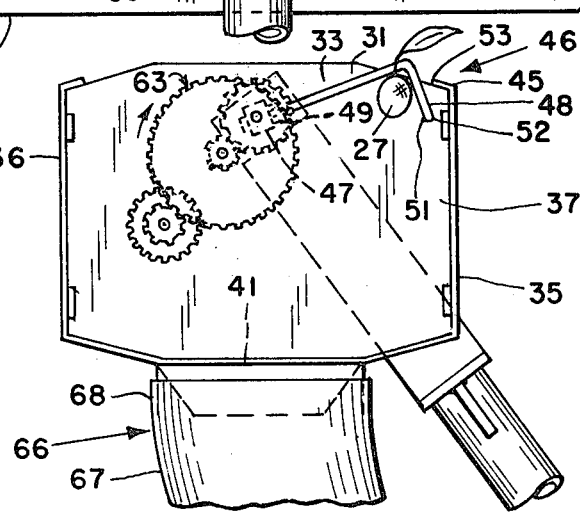
FIG. 5 is an end elevation partly in section on line 5—5 of FIG. 4 showing the gear reduction power train for the shaft of the rotating hooked fingers.

A rake-like member 46 extends across the upper portion of the collection hopper 31 and consists of the shaft 47, journalled in the upper, central portions of the opposite end walls 37 and 38, proximate the level of the open top 32 and having a plurality of straight rows of equally spaced, hooked tines such as 48 spaced therearound one row in each quadrant includes a base portion 49 extending radially outwardly from, and fast on, shaft 47, and a free terminal portion 51, bent at right angles to the base portion to extend circumferentially relative to the shaft, 47. As best shown in FIG. 5, the upper portion of front wall 35 is preferably in a flat plane, and bent inwardly to form the ledge 45, and the set of free, terminal portions 51 of the hooked tines 48, when rotated in a circular path, including a zone in close proximity thereto are momentarily in a flat plane parallel to the plane of the upper portion of the front wall, the tips 52 of the tines having nearly touched the adjacent inner edges 53 of the ledge 45 lining the hopper.

The tips 52 of the hooked tines 48 are rounded and blunt and they are spaced apart along the shaft at such distance as will enable them to hook, or rake, off the olives, or other fruit, while the leaves pass through the tines without being dislodged from the tree into the hopper.

Handle means 54 includes the elongated handle 55, formed of multiple, interconnected sections in a known manner, and having a yoke 56 at the upper end in which the picking head 29 is pivotally supported as at 58 and 59 in the upper portions of its end walls so as to hang downwardly gimbal fashion. The lower end 61 of the handle is shown being held by, and manipulated by, a user 22, while another user manipulates a second apparatus of the invention on another, lower portion of the tree 21.

The power drive compartment 33 contains an electric motor 62 and a power train 63 in the form of intermeshed reduction gears 64, connecting the motor 62 to the shaft 47 to rotate it unidirectionally at about 60 r.p.m. The motor is connected by flexible electric conductors 60 to a suitable source of electricity such as battery pack 64 located proximate ground level 23. It will be understood that the shaft 47 could be rotated by an air motor, hydraulic motor, spring motor or any other convenient power source but a small, light motor and gear train in the head and a flexible power conduit to the ground level is preferred.

The discharge conduit means 66 of the invention consists of a light-weight, flexible, conduit 67 of Nylon fabric, or the like, having its upper end 68 affixed around the discharge opening 41 in the bottom wall 39 of hopper 31 and extending downwardly to a lower end 69 in the collection receptacle 71 at, or near ground level 23. Thus, the picked olives raked into the hopper, roll gently down the cloth passage, by gravity, while supported by the cloth, for deposit in the receptacle without damage.

The picking apparatus of the invention, including the head and handle, may be made of a light, hard plastic or of light metal and the motor can be powered from the 12 volt battery of a vehicle such as a tractor or automobile.

The motor 62 is preferably of the reversible type, so that if a branch is inadvertently caught in the hooked tines, rather than pushed aside, the branch can be instantly released by reversing the motor and temporarily rotating the hooked tines in the opposite angular direction.

While I have shown the handle 55 as sectional, and the electric conductor 60 as one piece and outside the handle, I may have the electric conductor also sectional and connected together at each joint of the handle by suitable male and female electric plugs and receptacles.

In the prior art, rotating sharp pointed straight comblike tines have tended to damage the bark of the twigs and branches of the trees during operation. The hooked tines 48, of this invention are preferably blunt tipped and of smooth metal to slide off a twig or branch without damage. However, in some embodiments of the invention, the hooked tines may be coated with a soft layer of rubber-like material to avoid damage to the tree.

Figure 2:
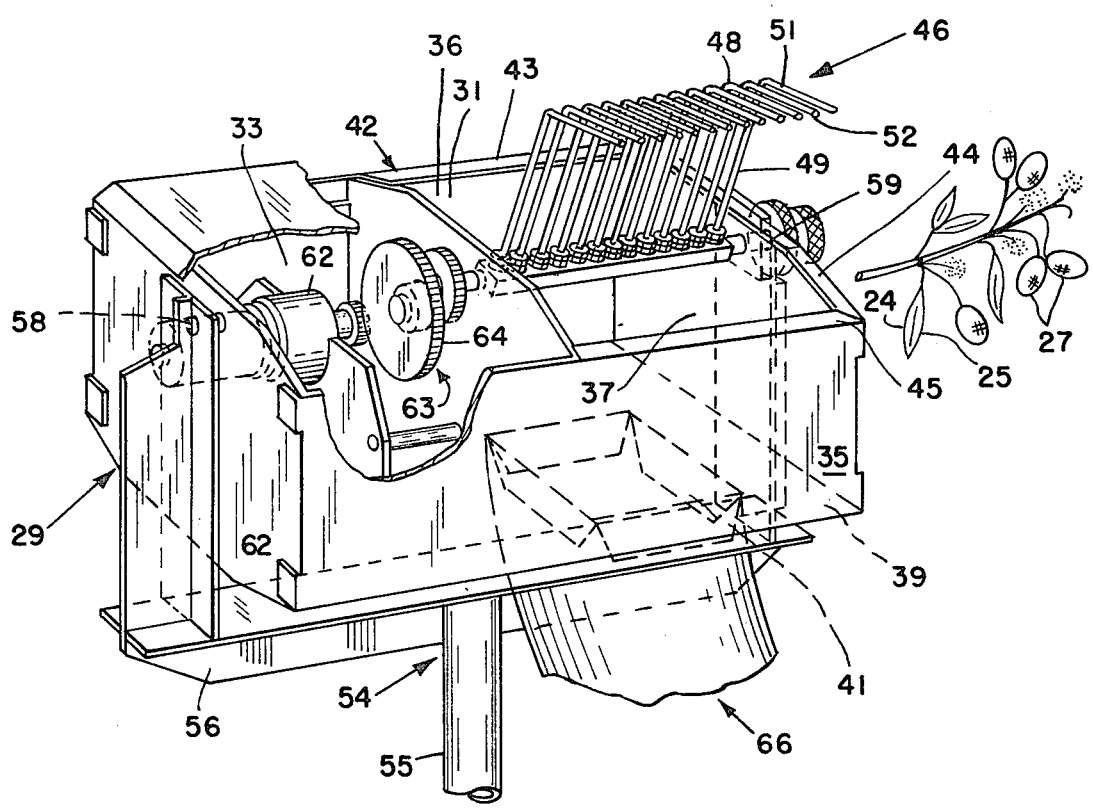
FIG. 2 is an enlarged, fragmentary perspective view of the picking head of the invention.
Figure 3:
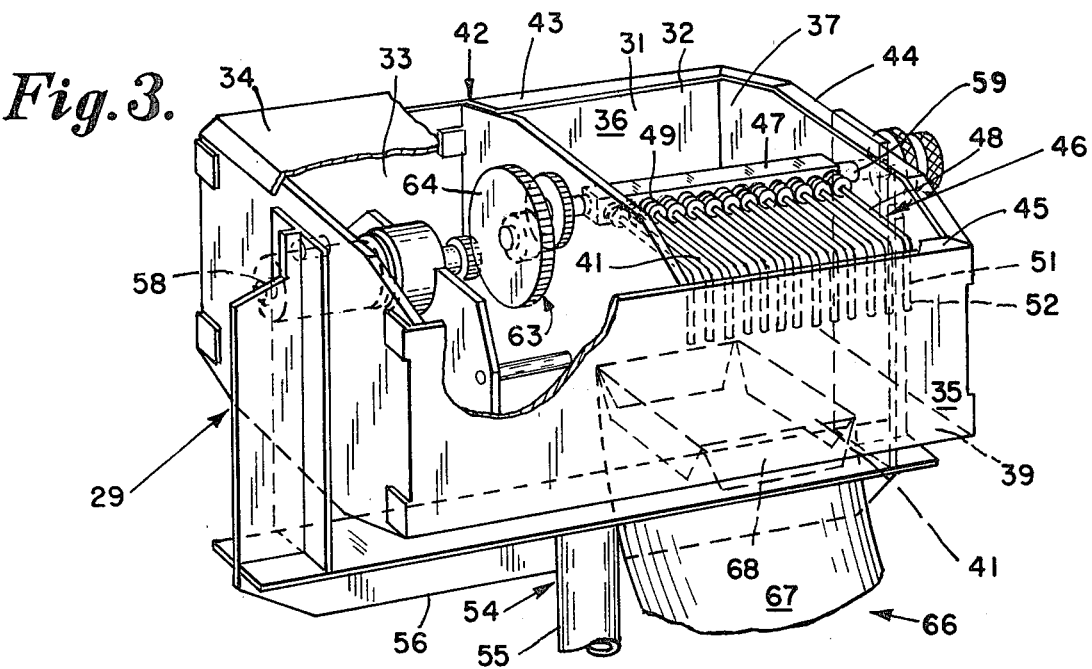
FIG. 3 is a view similar to FIG. 2 showing the hooked tines of the rake-like member in another position of rotation.
Figure 4:
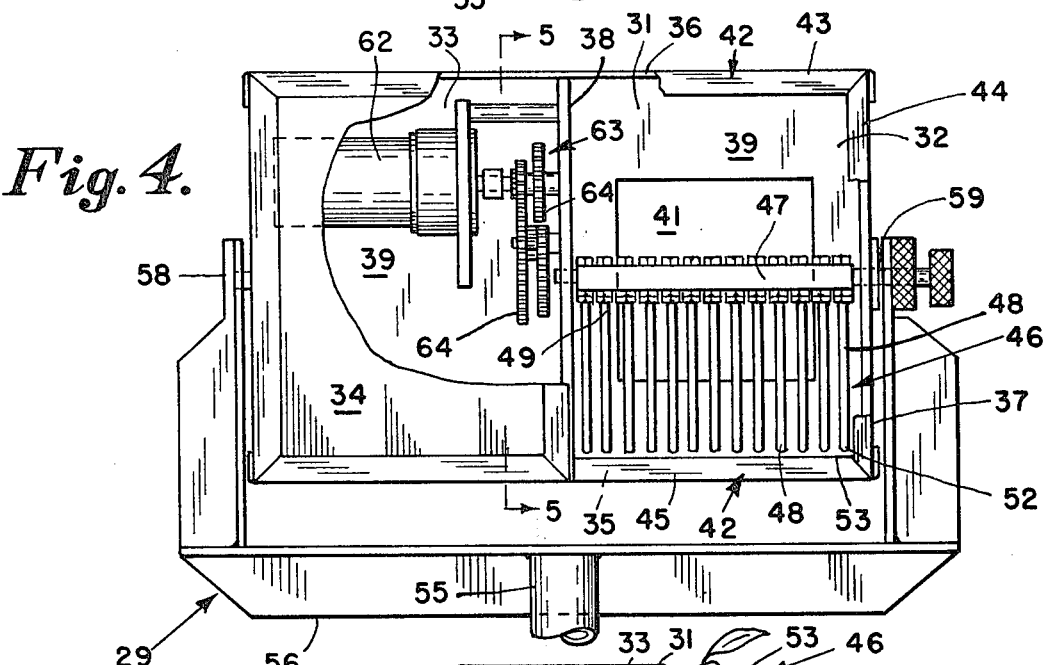
FIG. 4 is a top plan view of the picking head and its gimbal yoke, with the cover partly broken away to show the motor compartment.

As best shown in FIG. 5, the hooked tines 48, are inflexible and do not bend or yield. Instead the blunt tips of a pair of adjacent tips penetrate the foliage on each side of the stem of the depending olive 27 to pull the olive down into the hopper 31 and gently dislodge it from the tree branch which is being held back and supported by the ledge 45 as indicated in FIG. 2.

I claim:

1. Portable, hand supported and hand manipulated apparatus for enabling the picking of tree growing olives, by a person from ground level, said apparatus comprising:
   a picking head having a collection hopper with a front and rear wall, a pair of opposite end walls, an open top and a bottom wall with a discharge opening;
   a ledge extending along the rim of said open top on said front wall;
   a rake-like member comprising a shaft extending across said hopper and journalled centrally in said opposite end walls, proximate the level of said open top, said shaft having a plurality of straight rows of equally spaced hooked tines spaced therearound and projecting outwardly therefrom and said tines being inflexible and having free terminal tips adapted to define a circular path including a zone wherein they are closely spaced from, and nearly touch said ledge along said front wall of said hopper;
   an elongated, sectional, handle supporting said head for manipulation thereof by a person standing on the ground;
   power means including a motor in said head, operably connected to said shaft for rotating the same unidirectionally, and powered from ground level;
   and discharge conduit means, connected to the discharge opening in said bottom wall for guiding picked olives from said hopper to a receptacle on the ground.

2. Apparatus as specified in claim 1 wherein:
said hooked tines are each right angularly formed, with a base portion extending radially outwardly from said shaft and a terminal, integral, hooked portion extending normal to said base portion and generally circumferentially relative to said shaft
and said tips of each row of hooked tines are spaced apart at such distance as will enable them to hook, or rake, off olives while leaves pass therethrough without dislodgement.

3. Apparatus as specified in claim 2 wherein:
the upper portion of the front wall of said hopper is in a substantially flat plane, and said terminal right angularly hooked portions, all extend in parallelism in a common flat plane, said terminal hooked portions being spaced a predetermined uniform distance from the upper portion of said front wall and from said ledge when momentarily rotated in their circular path into the zone of said path in the vicinity thereof.

4. Apparatus as specified in claim 1 wherein:
said apparatus includes a gimbal yoke at the upper end of said rod, supporting said picking head.

5. Apparatus as specified in claim 4 wherein:
said picking head includes a built-in, power compartment alongside said hopper, said compartment having a cover and containing an electric motor and gear reduction train drivingly connected to said shaft;
said apparatus includes a source of electric current supported at ground level, and connected to said motor for driving said motor.

6. Apparatus as specified in claim 4 wherein:
said picking head includes a power compartment alongside said hopper containing a motor and a drive train located in the lower portion of said power compartment and operably connected to said shaft; and
said apparatus includes a source of power supported proximate ground level and a power conduit connecting said source to said motor.

7. Apparatus as specified in claim 1 wherein:
said upper end of said elongated handle includes a gimbal yoke in which the upper portions of the opposite ends of said head are pivoted, and a drive motor mounted in the lower portion of said head to provide a gimbal effect for keeping the open top of said hopper facing olives depending downwardly from a branch.

8. A hand manipulated picker for picking tree borne olives from ground level said apparatus comprising:
  a picking head having an open topped hopper alongside a closed top power compartment;
  said open topped hopper having a ledge along at least some of said open top and a shaft extending across the central, upper portion thereof;
  a plurality of straight rows of right angularly hooked tines projecting outwardly from said shaft and adapted to rake olives into said hopper during rotation by said shaft in close cooperation with said ledge;
  an electric motor and gear reduction unit in said power compartment, drivingly connected to rotate said shaft;
  an elongated handle having a gimbal yoke at the upper end gimbal mounting said head to maintain the open top of said hopper facing upward toward depending olives despite the angle of said handle;
  said handle supporting said head at a spaced height above ground level;
  flexible wire conductors connecting said motor to a source of electricity supported proximate ground level; and
  a flexible, fabric olive conduit connecting said hopper to a collection receptacle supported proximate ground level.

9. Apparatus as specified in claim 8 wherein:
  said hooked tines are of metal coated with a soft layer of rubber-like material.

10. Apparatus as specified in claim 8 wherein:
  said ledge extends around the entire upper rim of the open top of said hopper for intercepting and supporting olive branches while said olives are raked into said hopper by the tips of adjacent pairs of said right angularly hooked tines.

* * * * *